(12) United States Patent
Elmoznino et al.

(10) Patent No.: US 11,645,497 B2
(45) Date of Patent: May 9, 2023

(54) SYSTEM AND METHOD FOR AUGMENTED REALITY USING CONDITIONAL CYCLE-CONSISTENT GENERATIVE IMAGE-TO-IMAGE TRANSLATION MODELS

(71) Applicant: L'Oreal, Paris (FR)

(72) Inventors: Eric Elmoznino, Toronto (CA); He Ma, North York (CA); Irina Kezele, Toronto (CA); Edmund Phung, Toronto (CA); Alex Levinshtein, Thornhill (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 732 days.

(21) Appl. No.: 16/683,398

(22) Filed: Nov. 14, 2019

(65) Prior Publication Data

US 2020/0160153 A1 May 21, 2020

Related U.S. Application Data

(60) Provisional application No. 62/767,769, filed on Nov. 15, 2018.

(51) Int. Cl.
*G06N 3/045* (2023.01)
*G06T 19/00* (2011.01)
(Continued)

(52) U.S. Cl.
CPC ............. *G06N 3/045* (2023.01); *G06F 3/011* (2013.01); *G06N 3/047* (2023.01); *G06N 3/08* (2013.01);
(Continued)

(58) Field of Classification Search
CPC ........ G06N 3/0472; G06N 3/088; G06N 3/08; G06N 3/0454; G06N 20/00; G06N 3/0481;
(Continued)

(56) References Cited

U.S. PATENT DOCUMENTS

2019/0080205 A1* 3/2019 Kaufhold ................ G06N 3/08
2019/0279075 A1* 9/2019 Liu ...................... G06N 3/0472
2019/0295302 A1* 9/2019 Fu ......................... G06N 3/088
(Continued)

OTHER PUBLICATIONS

Lu, Y. et al., "Attribute-Guided Face Generation Using Conditional CydeGAN", The Hong Kong University of Science and Technology, Nov. 14, 2018, 16 pages.
(Continued)

*Primary Examiner* — Xilin Guo
(74) *Attorney, Agent, or Firm* — Oblon, McClelland, Maier & Neustadt, L.L.P.

(57) ABSTRACT

Systems and methods relate to a network model to apply an effect to an image such as an augmented reality effect (e.g. makeup, hair, nail, etc.). The network model uses a conditional cycle-consistent generative image-to-image translation model to translate images from a first domain space where the effect is not applied and to a second continuous domain space where the effect is applied. In order to render arbitrary effects (e.g. lipsticks) not seen at training time, the effect's space is represented as a continuous domain (e.g. a conditional variable vector) learned by encoding simple swatch images of the effect, such as are available as product swatches, as well as a null effect. The model is trained end-to-end in an unsupervised fashion. To condition a generator of the model, convolutional conditional batch normalization (CCBN) is used to apply the vector encoding the reference swatch images that represent the makeup properties.

51 Claims, 4 Drawing Sheets

(51) Int. Cl.
*G06N 20/00* (2019.01)
*G06F 3/01* (2006.01)
*G06N 3/08* (2023.01)
*G06N 3/047* (2023.01)

(52) U.S. Cl.
CPC .......... *G06N 20/00* (2019.01); *G06T 19/006* (2013.01); *G06T 2207/20081* (2013.01)

(58) Field of Classification Search
CPC ............... G06T 11/60; G06T 19/006; G06T 2207/20084; G06T 2207/20081; G06T 5/50; G06F 3/011; G06V 10/82; G06V 10/764
See application file for complete search history.

(56) References Cited

U.S. PATENT DOCUMENTS

| 2020/0098141 | A1* | 3/2020 | Mikkola | G06N 3/0454 |
| 2020/0126283 | A1* | 4/2020 | van Vuuren | G06T 17/20 |
| 2020/0294201 | A1* | 9/2020 | Planche | G06T 5/002 |

OTHER PUBLICATIONS

Zhu, J. Y. et al., "Unpaired Image-to-Image Translation using Cycle-Consistent Adversarial Networks", IEEE International Conference on Computer Vision, 2017, 10 pages.

Isola, P. et al., "Image-to-Image Translation with Conditional Adversarial Networks", IEEE International Conference on Computer Vision, 2017, 10 pages.

Extended European Search Report dated Jul. 15, 2022, in corresponding European Patent Application No. 19885726.0, 15 pages.

Li Huai-Yu et al: "Facial Image Attributes Transformation via Conditional Recycle Generative Adversarial Networks", Journal of Computer Science and Technology, Springer Singapore, vol. 33, No. 3, May 11, 2018, pp. 511-521, XP036502347.

Jun-Yan Zhu et al: "Unpaired Image-to-Image Translation using Cycle-Consistent Adversarial Networks", Arxiv.Org, Cornell University Library, 201 Olin Library Cornell University Ithaca, NY 14853, Mar. 30, 2017, XP080753281.

Chang Huiwen et al: "PairedCycleGAN: Asymmetric Style Transfer for Applying and Removing Makeup", 2018 IEEE/CVF Conference on Computer Vision and Pattern Recognition, IEEE, Jun. 18, 2018, pp. 40-48, XP033475963.

Tingting Li et al: "BeautyGAN", Multi Media, ACM, 2 Penn Plaza, Suite 701 New York NY10121-0701 USA, Oct. 15, 2018, pp. 645-653, XP058417449.

Lu Yongyi et al: "Attribute-Guided Face Generation Using Conditional CycleGAN: 15th European Conference, Munich, Germany, Sep. 8-14, 2018, Proceedings, Part XII" In: "Pattern Recognition: 5th Asian Conference, ACPR 2019, Auckland, New Zealand, Nov. 26-29, 2019, Revised Selected Papers, Part II", Jan. 1, 2018 (Jan. 1, 2018), Springer International Publishing, Cham, XP055933592. ISSN: 0302-9743, ISBN: 978-3-030-41298-2 vol. 11216, pp. 293-308, DOI:10.1007/978-3-030-01258-8_18, Retrieved from the Internet: URL:https://openaccess.thecvf.com/content_ECCV2018/papers/Yongyi_Lu_Attribute-Guided_Face_Generation_ECCV2018_paper.pdf.

* cited by examiner

SYSTEM AND METHOD FOR AUGMENTED REALITY USING CONDITIONAL CYCLE-CONSISTENT GENERATIVE IMAGE-TO-IMAGE TRANSLATION MODELS

CROSS-REFERENCE

This application claims the domestic benefit of U.S. Provisional Application No. 62/767,769 filed Nov. 15, 2018, the contents of which are incorporated herein by reference.

FIELD

This disclosure relates to image processing and more particularly to creating an augmented reality through image processing, translating an image using conditional cycle-consistent generative image-to-image translation models (e.g. neural network models).

BACKGROUND

A real time virtual makeup application provides users with an interactive experience in augmented reality with high preservation of identity and detailed realism. Ideally, users like to have a preview of makeup products (e.g. lipstick or eye shadow) without actually trying them on. In addition, virtual try-on's give users a freedom to tune relevant attributes of the product (e.g. color and glossiness) according to their personal preferences.

Most such applications depend on classical machine learning or computer vision techniques which involves two steps: detecting facial landmarks based on a cascade of regression forests or other methods; and render the output image using traditional graphics techniques and the detected landmarks. This two-step solution is quite fast and produces believable results in most cases, but has several limitations. Notably: (i) a shape of the rendered makeup is limited by accuracy of the detected landmarks; (ii) color and shine of the virtual makeup need to be manually engineered based on estimates of the properties of the actual product, lighting direction and intensity etc.; and (iii) blending between virtual makeup and the original image needs to be carefully tuned according to the person's skin tone.

Due to these limitations and others, this solution cannot easily scale to a large amount of products while maintaining realism. To support a new product, one must tune these parameters until they result in a rendering that looks sufficiently like the actual product. This process is both time intensive and inaccurate, and therefore scales poorly as the product catalogue increases in size.

Work has been done on exploring and learning facial feature space in a purely unsupervised fashion. However, the task of makeup application is more strict in the sense that only relevant areas should to be modified, while other parts or attributes of the face should remain identical as much as possible—the identity preservation problem.

Image to Image Translation

Manipulating a specific facial attribute can be seen as an image-to-image translation problem. Pix2pix [1] (references are listed herein below and are incorporated herein by reference where permissible) and CycleGAN [2] tackle this two-domain problem using GANs. The former leverages paired image datasets whereas the latter can learn the translation model from two unpaired datasets thanks to a cycle-consistency loss, which reduces the number of possible mapping functions in the solution space. One notable shortcoming of CycleGAN is that it is incapable of translation between more than two domains. Based on Cycle-GAN's architecture, PairedCycleGAN [3] specifically addresses the makeup generation problem by optimizing a cycle-consistency loss when translating a no makeup photo to the makeup style of a reference photo and translating the reference photo into a no makeup photo. The generator for makeup application takes as input 1) a source no-makeup image and 2) a reference image with the target makeup applied, and outputs the source image with the applied makeup while preserving its identity. The primary difference between this method in PairedCycleGAN and CycleGAN is that the two generators, corresponding to makeup application and makeup removal, are asymmetric functions wherein one transfers a style and the other removes it. While this work clearly demonstrates that a GAN with cycle-consistency loss is capable of learning complex lipstick properties and rendering them accurately, the need for a reference image is problematic for realistic use cases.

If the model were to be used in an online store as a virtual try-on feature, reference images would be required for each product. Moreover, aspects such as the lighting and the identity in the reference image would affect the lipstick representation in subtle ways, limiting the model's ability to encode the true lipstick properties rather than those displayed in a single example.

Conditional Image Generation

Recent development in generative models tackle the problem of modeling real world high dimensional data distributions. The two main streams of generative models are generative adversarial networks [4] and log-likelihood based methods (e.g. autoregressive models [5], variational auto-encoders [6] and invertible generative flow [7]). These models can be conditioned on a sub-distribution of real data by feeding in a label during training. The details on how to implement this conditional probabilistic model vary in recent literatures.

Conditional GAN (cGAN) [8] minimizes the difference between a Generator distribution and a subset of target data distribution given a conditional variable vector $\vec{e}$. Mirza et al. [9] and Reed et al. [10] have tried concatenating a condition vector to the input of the Discriminator or to the feature maps in between intermediate convolutional layers. There are also explorations in StarGAN [11] of using the label information to supervise an extra classifier built on top of the feature vector in the Discriminator. Miyato et al. [8] tried using an output projection method which takes an inner product between the condition vector and the feature vector in the Discriminator.

Typically for cGANs, both the Discriminator and Generator need to be conditioned for best performance according to recent literature and experiments. Miyato et al. [8], incorporated herein by reference in its entirety, borrow the idea from Perez et al. [12] to use a conditional batch normalization (CBN) layer for conditioning the Generator of the cGAN.

SUMMARY

It would therefore be desirable to have an end-to-end model that can learn a conditional makeup space on its own. That is, by training on images and/or video of real world people wearing makeup, the model could learn how to preserve the identity of the person while at the same time modifying the image to produce a realistic rendering of the makeup.

There is disclosed a conditional cycle-consistent generative image-to-image translation model", for example, a modified CycleGAN architecture with an added feature, for example a cGAN feature. The added feature is employed to minimize the difference between a Generator distribution and a subset of target data distribution given a conditional variable vector encoding reference swatches representing augmented reality image properties, such as makeup properties. More specifically, to condition the Generator, a convolutional conditional batch normalization (CCBN) is used to apply the vector encoding the reference swatch images that represent the effect's (e.g. makeup) properties.

There is provided a computing device to translate an image from a first domain space to a second continuous domain space according to an effect to be applied to the image. The computing device comprises: a storage unit storing a conditional cycle-consistent image-to-image translation model, configured to translate the image to the second continuous domain space, wherein the model is conditioned through training using a plurality of encodings representing, in a continuous manner, physical properties of the effect to be applied and wherein the plurality of encodings are encoded from a plurality of respective discrete instances of the effect to be applied, the respective discrete instances including an instance representing no effect to be applied; and a processing unit configured to: receive the image and a desired instance of the effect to be applied; provide the image and the desired instance to the model to obtain a translated image; and provide the translated image for presenting.

The effect to be applied may be one of a makeup effect, (e.g. a virtual lipstick), a nail effect (e.g. a finger or toe nail effect such as a manicure and a pedicure effect) and a hair coloration effect.

The image may be free from the effect to be applied and the first domain space is defined by a plurality of images each free from the effect to be applied.

The model may comprise a conditional cycle-consistent generative adversarial network (ccGAN) model.

The model may comprise a Generator (G) and a Discriminator (D) respectively trained using the plurality of encodings encoded by an encoder (b).

The Generator (G) may be conditioned with the plurality of encodings using convolutional conditional batch normal operations for each respective encoding of the plurality of encodings.

The Discriminator (D) may be conditioned with the plurality of encodings using output projection operations for each respective encoding of the plurality of encodings.

The encoder may be configured to encode the physical properties of each of the respective instances of the effect to be applied from respective swatch images for each of the respective instances including a swatch image representing no effect to be applied.

The model may comprise the Generator (G) as trained.

The computing device may be coupled to a data store (e.g. a data storage device which may be configured as a database) configured to store the plurality of encodings; and the processing unit may be configured to provide to the model a corresponding one of the plurality of encodings corresponding to the desired instance of the effect to be applied. The data store may store one or more non-trained instance encodings for respective instances of the effect to be applied that were not trained to the model; and the processing unit may be configured to provide to the model a corresponding one of the one or more non-trained instance encodings corresponding to the desired instance of the effect to be applied.

Parameters θ of the Generator G may be optimized by minimizing an adversarial loss in two complementary directions and a cycle-consistency loss according to:

$$\theta_G\hat{} = \arg\min_{\theta_G} \mathcal{L}_{GAN}(G,D|z_j) + \mathcal{L}_{GAN}(G,D|z_0) + \lambda \mathcal{L}_{cyc}(G).$$

Parameters θ of the Discriminator D may be optimized by maximizing the adversarial loss in two complementary directions according to:

$$\theta_D\hat{} = \arg\max_{\theta_D} \mathcal{L}_{GAN}(G,D|z_j) + \mathcal{L}_{GAN}(G,D|z_0)$$

The image may comprise a selfie image or a selfie video, and, in the case of the selfie video, the processing unit is configured to translate images of the selfie video to apply the effect thereto to create a 3D effect, particularly a 3D makeup effect.

The image may be preprocessed by the processing unit prior to providing to the model.

The translated image may comprise a region of the image and wherein the processing unit is configured to blend the translated image into the image for presenting.

The computing device may comprise or be coupled to a camera to capture the image for the processing unit to receive. The computing device may comprise a server and the processing unit may be configured to receive the image and the desired instance from a client device in communication with the server.

The storage device may store instructions for an interface to provide a user with a desired instance selection function to define the desired instance and the processor may be configured by the instructions to provide the interface, receive input and define the desired instance in response to the input. The input may comprise a custom effect not previously trained to the model. The storage device may store instructions for a search function to search previously computed encodings for use to define the desired effect. The processor may be configured by the instructions to use the input and search function to find a best match for the custom effect from the computed encodings to define the desired effect. The storage device may store instructions for providing an encoding function to define a new encoding for the desired effect and The processor may be configured by the instructions to use the input and the encoding function to define the desired effect for the custom effect.

There is provided a computing device configured to generate a conditional cycle-consistent image-to-image translation model, the model configured to translate an image from a first domain space to a second continuous domain space according to an effect to be applied to the image. The computing device comprises: a storage device storing the model comprising a Generator, a Discriminator and an encoder, the model configured to condition the Generator and the Discriminator through training using a plurality of encodings from the encoder representing, in a continuous manner, physical properties of the effect to be applied and wherein the plurality of encodings are encoded from a plurality of respective discrete instances of the effect to be applied, the respective discrete instances including an instance representing no effect to be applied; and a processing unit configured to: receive training data and provide the training data in batches to the model to define the model as trained. The model may comprise a conditional cycle-consistent generative adversarial network (ccGAN) model.

To receive the training data, the processing unit may be configured to: receive a plurality of real images x from the first domain space X comprising a no-effect applied domain space and each x having no effect applied; receive a plurality of real images $y_j$ from the second continuous domain space Y comprising an effect applied domain space and each $y_j$ having an instance j of the effect applied, where j=1, 2, 3, . . . represents each of the respective discrete instances of the effect; receive a plurality of reference images $z_j$ to represent each of the respective discrete instances of the effect; and receive a white image $z_0$ corresponding to no effect to be applied. The processing unit may be further configured to initiate parameters $\theta_G$ and $\theta_D$ for the Generator (G) and Discriminator (D). To provide the training data in batches, the processing unit may be configured to operate to: repeatedly, in batches and training epochs determined from the training data, use the encoder to encode an encoding $E(z_j)$ for the Generator (G) and Discriminator (D); use the encoder to encode an encoding $E(z_0)$ for the Generator; provide the image x and encoding $E(z_j)$ to the Generator (G) to generate a fake image $y_{j_{fake}}$ in the second continuous domain space; provide the fake image $y_{j_{fake}}$ and real image $y_j$ corresponding thereto with encoding $E(z_j)$ to the Discriminator (D) to generate output $d_j$; provide the fake image $y_{j_{fake}}$ and encoding $E(z_0)$ to the Generator (G) to output x'; and optimize parameters $\theta_G$ for the Generator (G) by minimizing the adversarial loss and cycle-consistency loss, and optimize parameters $\theta_D$ for the Discriminator (D) by maximizing the adversarial loss according to:

$$\hat{\theta_G} = \arg\min_{\theta_G} \mathcal{L}_{GAN}(G,D|z_j) + \mathcal{L}_{GAN}(G,D|z_0) + \lambda \mathcal{L}_{cyc}(G)$$

$$\hat{\theta_D} = \arg\max_{\theta_D} \mathcal{L}_{GAN}(G,D|z_j) + \mathcal{L}_{GAN}(G,D|z_0).$$

Persons of ordinary skill will also recognize equivalent method and computer program product aspects.

Figure 1:
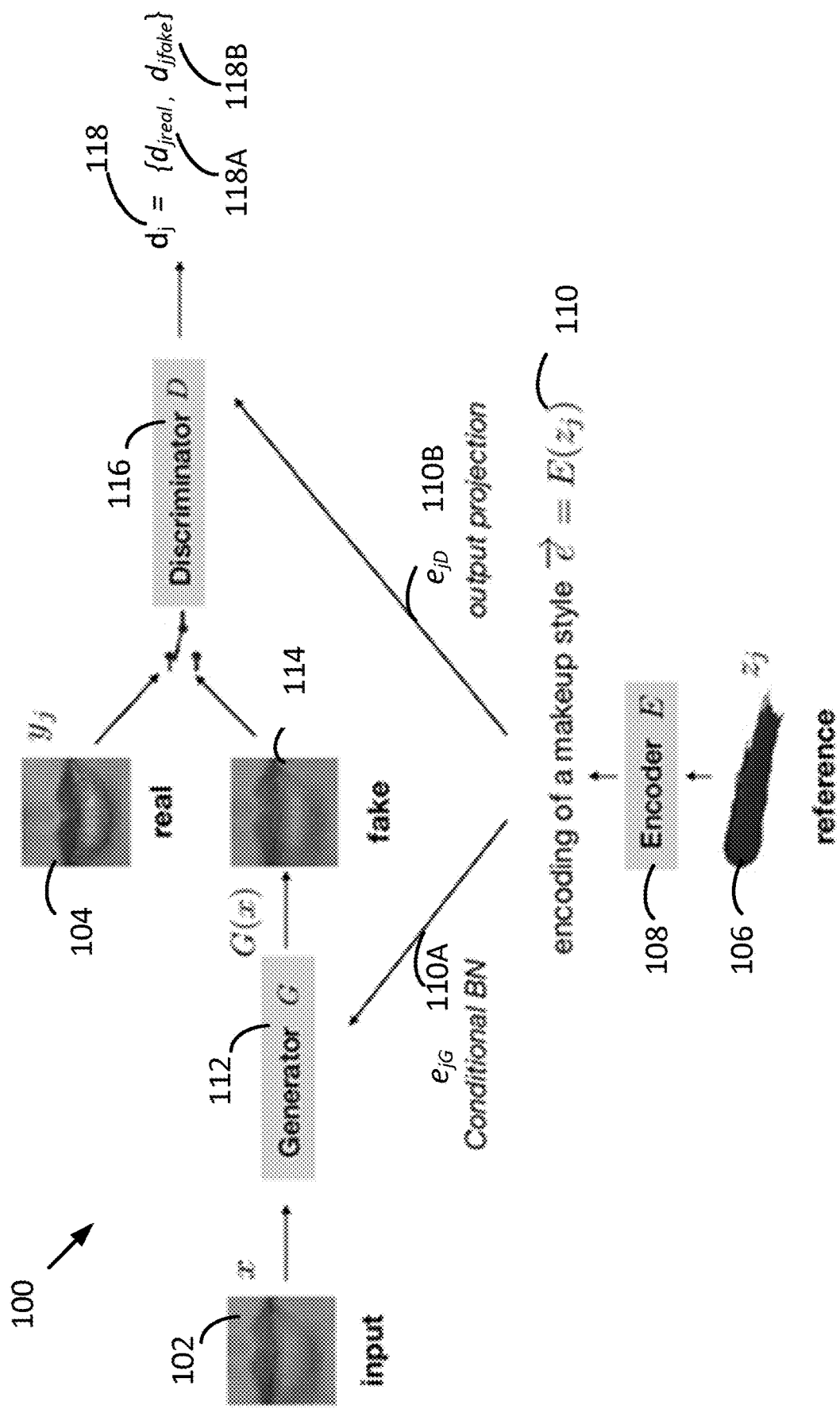
FIG. 1 is a representation of data flow to train a model using a conditional GAN with cycle consistency loss.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light. Though primarily described with reference to virtual lipsticks as a makeup effect the teaching herein may be applied to other augmented reality effects, including but not limited to makeup, nail, and hair coloration, as will be understood by a person of ordinary skill in the art.

DETAILED DESCRIPTION

Recently, conditional generative image-to-image translation networks such as conditional GANs with cycle-consistent losses have achieved remarkable results for image translation tasks between domains. The primary advantage of these methods is that they can be trained on unpaired data, which assists with many problems, including problem of augmented reality. Obtaining two real world images, one with a makeup effect such as lipstick and the other without, while keeping all other variables such as pose and lighting identical is well-nigh impossible or time and resource prohibitive. In other words, obtaining sufficient quantity of paired ground truth data such as for supervised learning is unavailable.

An additional issue may be considered to relate to the effect to be applied. For example, in the lipstick domain (but similarly in other domains) a conditioning parameter may be employed so that it can represent the various different lipsticks we wish to apply, where this conditioning parameter can be thought of as specifying a sub-domain. This condition is not simply represented as a discrete one-hot encoding of the lipstick product, since this method is not scalable and does not leverage the fact that lipsticks exist in a shared, continuous space of physical properties. There is disclosed an approach that creates a representation of the lipsticks' (effect's) physical properties by encoding simple swatch images and uses that encoding to condition the image to image translation model (e.g. a GAN). This approach frames the problem as translation between 1) a unique no-lipstick domain and 2) a continuous lipstick domain.

Having described the task and a motivation behind it, it will be understood that the present document discloses: (i) a training of a model that translates images to a continuous domain space defined by physical (effect) lipstick properties, where (ii) the model learns a representation of these physical properties automatically from a simple input that contains all of the necessary information about the lipstick (effect), such as a swatch image.

Model Architecture

Currently, we opt for the CycleGAN architecture [2] with some additional modifications to provide the conditional cycle-consistent generative image-to-image translation model. We use a single pair of Discriminator/Generator as well as conditioning to replace the original two-domain architecture. In this way it can be extended to more than two directions of translation in a multi-dimensional continuous encoding space. In order to render arbitrary lipsticks not seen at training time, we represent the space of lipsticks as a continuous domain learned by encoding simple swatch images of the products. As noted, lipsticks are an example of a physical effect and other effects are contemplated (e.g. other facial or other skin makeup, hair coloration, nail effects, etc.)

We also use the output projection method introduced in cGAN which shows better training stability and less mode collapse.

Both Discriminator and Generator model architectures are modified from CycleGAN [2]. The Generator, named ResNetGenerator, is an encoder-bottleneck-decoder type architecture. The Discriminator, named NLayerDiscriminator, is a regular encoder type architecture. The network details are listed herein below.

For better conditioning performance, we condition the Discriminator with an output projection and condition the Generator with conditional batch normalization. We apply spectral normalization to all weights in both the Discriminator and Generator.

FIG. 1 shows a data flow 100 representing a model diagram. A no-lipstick image x 102 (e.g. a no-makeup image from the no-makeup domain) and a lipstick image $y_j$ 104 (e.g. a makeup image from the makeup domain) are provided where j denotes the lipstick identity (e.g. j=1, 2, 3, . . . in a target sub-domain of makeup). For each lipstick product j, there is provided a swatch reference image $z_j$ 106.

There is first produced a representation of the lipstick j by feeding reference image $z_j$ 106 through the encoders 108 to produce $e_j = E(z_j)$ 110 comprising, respectively $e_{j_G} = E_G(z_j)$ 110A and $e_{j_D} = E_D(z_j)$ 110B. Using encoding 110A and Generator G 112, there is produced a fake lipstick image $y_{j_{fake}}$ 114=$G(x; e_{j_G})$. Images $y_{j_{fake}}$ 114 and $y_j$ 104 (i.e. the fake and real lipstick images) are passed to the Discriminator D 116 to produce $d_j$ 118={$d_{j_{real}}$=$D(y_j; e_{j_D})$, $d_{j_{fake}}$=$D(y_{j_{fake}}; e_{j_D})$} respectively labelled 118A and 118B in FIG. 1.

Finally, (though not shown) there is applied a cycle-consistency to remove the lipstick from $y_{j_{fake}}$. To do this, Generator G 112 is conditioned on the no-lipstick case, which is performed by encoding a blank white swatch, denoted as $z_0$, yielding x'=$G(y_{j_{fake}}; E_G(z_0))$.

The encoding of the makeup style $e_{j_G} = E_G(z_j)$ 110A conditions the Generator G 104 using convolutional conditional batch normal operations. That is, the output of the encoder E is adapted for conditioning of CBNs at different residual blocks of the generator network. This is achieved by inserting small convolutional networks between the encoder and each CBN of the given block (not all blocks would necessarily be conditioned by a CBN, but ablation studies proved that having only one block conditioned was suboptimal). The CCBNs are all trained when training the Generator G 112 so as to retrieve the optimal weights for adapting the code conditioning.

The encoding $e_{j_D} = E_D(z_j)$ 110B conditions the Discriminator D 116 using output projection operations. The encoder E 108 is a shallow network consisting of a convolutional layer and an adaptive average pooling layer, whose output is then reshaped into a one-dimensional encoding $\vec{e}$.

The model architecture for each of the Generator G 112, Discriminator D 116 and encoder E 108 can also be found in the tables below relating to network details. The reference encoder is respectively described in the tables for the Generator G and Discriminator D.

During training, the parameters of the Generator G 112 are optimized by minimizing the adversarial loss in two complementary directions and a cycle-consistency loss:

$$\theta_G^{\hat{}} = \arg\min_{\theta_G} \mathcal{L}_{GAN}(G,D|z_j) + \mathcal{L}_{GAN}(G,D|z_0) + \lambda \mathcal{L}_{cyc}(G) \quad (1)$$

$$\mathcal{L}_{GAN}(G,D|z_0) = \mathbb{E}_{x \sim p_{data}(x)}[\log D(x|z_0)] \quad (2)$$

$$+ \mathbb{E}_{y \sim p_{data}(y)}[\log(1-D(G(y|z_0)|z_0))] \quad (3)$$

$$\mathcal{L}_{GAN}(G,D|z_j) = \mathbb{E}_{y \sim p_{data}(y)}[\log D(y|z_j)] \quad (4)$$

$$+ \mathbb{E}_{x \sim p_{data}(x)}[\log(1-D(G(x|z_j)|z_j))] \quad (5)$$

$$\mathcal{L}_{cyc}(G) = \mathbb{E}_{x \sim p_{data}(x)}[\|G(G(x|z_j)-x\|_1)] \quad (6)$$

$$+ \mathbb{E}_{y \sim p_{data}(y)}[\|G(G(y|z_j)|z_j)-y\|_1] \quad (7)$$

where $p_{data}(x)$ and $p_{data}(y)$ are the respective distributions of the parametric data in the no-makeup and makeup domains.

The parameters of the Discriminator D 116 are optimized by maximizing the adversarial loss in two complementary directions.

$$\theta_D^{\hat{}} = \arg\max_{\theta_D} \mathcal{L}_{GAN}(G,D|z_j) + \mathcal{L}_{GAN}(G,D|z_0) \quad (8)$$

$$\mathcal{L}_{GAN}(G,D|z_0) = \mathbb{E}_{x \sim p_{data}(x)}[\log D(x|z_0)] \quad (9)$$

$$+ \mathbb{E}_{y \sim p_{data}(y)}[\log(1-D(G(y|z_0)|z_0))] \quad (10)$$

$$\mathcal{L}_{GAN}(G,D|z_j) = \mathbb{E}_{y \sim p_{data}(y)}[\log D(y|z_j)] \quad (11)$$

$$+ \mathbb{E}_{x \sim p_{data}(x)}[\log(1-D(G(x|z_j)|z_j))] \quad (12)$$

At Inference

During inference, only the Generator G 112 and encoder E 108 (or its encodings) as it relates to the Generator G 112 are used, but in ways that differ slightly from during training. The procedure can be summarized as follows:

1. For each lipstick j and its swatch image $z_j$, in the product catalogue, obtain its encoding $E_G(z_j)$ and store it in a data sore (e.g. a database) for later use. If multiple swatch images can be obtained for a given lipstick, a more reliable encoding can be inferred by averaging the encodings of each image.
2. To render a given lipstick j on a selfie image x, obtain j's encoding $e_{jG}=E_G(z_j)$ from the database and run the generator G $(x; E_G(z_j))$.
3. If the model was trained with selfies cropped to the lip region, blend the generator's output back into the original selfie image at the correct location.

The primary difference between inference and training is that the encodings can be pre-computed for each product in the lipstick catalogue. If necessary, these encodings can also be manually tweaked on test selfies in order to yield renderings which better mirror the real product. These encodings can be modified or combined in many ways to render lipsticks that don't actually exist. A user may be enabled to design their own lipstick (a e.g. a custom effect as the desired instance of the effect to be applied) by providing input to an interface such as by moving number sliders (e.g. to select values for encoding). A search function may then find a real product that closely matches the user's creation (e.g. custom effect) (e.g. using smallest Euclidean distance to an encoding in the product catalogue). This encoding of the effect may then be provided to the Generator along with an input image (e.g. static or video) to produce a modified image to virtually try on the user's creation. The custom effect may be encoded at run time and provided to the Generator. Thus, in a computing device having a processor and a storage unit storing instructions which when executed by the processor configure the operation of a computing device, the storage device may store instructions for an interface to provide a user with a desired instance selection function to define the desired instance. The processor may then provide the interface, receive input and define the desired instance in response to the input.

The input may define a custom effect not previously trained to the model. The storage device may store instructions for a search function to search previously computed encodings for use to define the desired effect. The processor may use the input and search function to find a best match for the custom effect from the computed encodings to define the desired effect. The storage device may store instructions to provide an encoding function to define a new encoding for the desired effect. The processor use the input and encoding function to define the desired effect from the custom effect.

At Retraining

At any time, new lipsticks could be added to the product catalogue simply by storing their swatch encoding in the database (data store). As noted in the previous section, this would not require any additional training. For the long-term maintenance of the application, however, it might be advantageous to retrain the model periodically when new lipsticks are added with physical properties that deviate significantly from those originally used to train the model.

For instance, the model might be initially trained on ordinary flat colours, and so would not generalize well to glittery lipsticks with heterogeneous properties. In this case, the model would need to be trained using swatches of glittery lipsticks and their resultant looks when applied to various people. Note, however, that this would not be a common occurrence, since in practice the vast majority of lipsticks share the same types of physical properties.

Operations for training and for inferencing are summarized and shown in the list of operations below:

---

List of Operations:
Conditional CycleGAN trained with reference image

1: procedure TRAINING
2: $\theta_G \leftarrow$ Generator parameter normal initialization
3: $\theta_D \leftarrow$ Discriminator parameter normal initialization
4: epoch $\leftarrow$ 0
5: while epoch<n_epochs do
6:    i $\leftarrow$ 0
7:    while i <n batches do
8:       x $\leftarrow$ a real image from domain X without lipstick
9:       $y_j \leftarrow$ a real image from domain Y with a specific lipstick j
10:      $z_j \leftarrow$ a reference image corresponding to the lipstick j used in $y_j$
11:      $z_0 \leftarrow$ a white image corresponding to no lipstick domain X
12:      $\mathcal{L} \leftarrow \mathcal{L}_{GAN}(G, D|z_j) + \mathcal{L}_{GAN}(G, D|z_0) + \lambda \mathcal{L}_{cyc}(G)$
13:      $\theta_D \leftarrow \theta_D + \eta_i \frac{\partial \mathcal{L}}{\partial \theta_D}$
14:      $\theta_G \leftarrow \theta_G + \eta_i \frac{\partial \mathcal{L}}{\partial \theta_G}$
15:      i $\leftarrow$ i + 1
16:    epoch $\leftarrow$ epoch + 1
17: procedure INFERENCING
18: $\theta_G \leftarrow$ trained parameter $\hat{\theta}_G$
19: x $\leftarrow$ a real image from a domain X
20: $z_j \leftarrow$ a reference image corresponding to a target type of lipstick j to be put on x
21: output $\leftarrow$ G(x|$z_j$)

---

Broadly, for training operations, respective Generator and Discriminator parameters are initialized. Training is performed in epochs comprising batches as is well known. In a training instance, training is performed with training data comprising, for each batch, a real image from the first domain without the effect applied, a real image from the second domain with the effect applied and an encoding of the effect applied. Also used is an encoding of no effect applied (the white effect image). The model components (Generator and Discriminator) process the training data and loss function(s) are determined. The respective Generator and Discriminator parameters are adjusted in accordance with the loss function for the next training instance.

Additional operational steps comprise collecting a makeup product dataset (an effect dataset). A dataset with large variance in products, identities, and environments is preferable to define the continuous space. Ideally, training images for Conditional CycleGAN are example images of people wearing the various products under various background. For example, additional operations may, for each product, collect 10 swatch reference images. Here, a variety of products would be the most important factor in order to cover the makeup encoding space and to generalize well on new unseen products belonging to the same space. In contrast, the variation and amount of images of people not wearing any makeup can be comparably less. The model is trained following the list of operations above by conditioning it on the physical representations of the makeup products that are being jointly learned by the encoder. The vectors encoding the effects may be stored to a data store comprising a storage device (e.g. a database) to provide to the model at inference, rather than encoding the swatch at inference time. This data store may define a catalog of effects.

Additional operations may add new lipsticks to the catalog (data store), either with or without retraining. Since we want to avoid retraining the model every time that we add a new product to our supported catalog, the ability of the model to generalize to new products is a key difference to existing technology. In any case, adding new products to the catalog is very straight-forward if the new product (e.g. a specific effect) to be added belongs to the same feature space as the products that the model has already been trained on. In other cases (e.g. where the new product is an outlier and not within the feature space that the model has already been trained on or if otherwise desired, the model may be retrained using the specific effect. For example, if the product to be added is drastically different to all existing products in the catalog (e.g. a new glittery lipstick when the catalog only contained single tones), or if a large number of new products are to be added to the catalog, then the model would may be fine-tuned on those new products and retrained on the entire combined new dataset.

An innovation of the presented image translation approach is that the Generator and Discriminator perform their tasks by learning and using physical properties of lipsticks, which they extract from simple swatch images. As a result, if the model were presented with a new product swatch never seen at training time, its task would remain unchanged and it should be able to generalize appropriately. It does not need to see any examples of what the new product looks like when applied to faces, because it can extract the product's physical properties and it knows how those properties influence the final look.

For this generalization to emerge, models are trained to see enough variation in lipstick types during training to be able to learn both the properties of lipsticks and their effects when applied to people. For instance, if the model was never shown examples of metallic lipsticks, it would not learn to represent the unique properties that constitute metallic materials, nor would it know how to use these properties in rendering. If, on the other hand, it had seen several types of metallic lipsticks and was presented one of a new colour after training, it would be able to encode its properties and render it correctly, so long as it had also seen similar colours during training Note that it need not have seen a similarly coloured metallic lipstick; seeing any type of lipsticks with similar colours should be sufficient.

Abstractly, we can see that the number of different lipsticks required for training is a function of the size of the feature space of the lipsticks we wish to render. Although this value is difficult to quantify, it suggests an optimal data-collection strategy that prioritizes variation in lipstick types as opposed to variation in environments with the same lipstick (i.e. many lipsticks with few examples each, rather than few lipsticks with many examples each).

EXPERIMENTS AND RESULTS

For all of our experiments, we use a dataset of images with lipstick and without. For simplicity of the experiments and their analysis, we do not consider other types of makeup, although the methods described could also apply to them.
Evaluation Metric Due to the lack of aligned ground truth images, the assessment of a learned image-to-image translation model is often difficult and varies depending on the nature of the task. In the case of makeup application, the area of lip should ideally be as realistic as applying a corresponding real lipstick whereas changes elsewhere on the face should be imperceptible.

To start with, we visually inspect the quality of the delta image, which is a normalized difference between generated and input image. This can be done without a ground truth image.

Although we can obtain aligned ground truth when evaluating the training on a synthetic dataset, obtaining aligned ground truth on real makeup datasets is usually very difficult. Instead of example-wise or point-wise comparisons, a universal way of evaluating the performance of generative models is to compare the distribution difference between the all ground truth images and generated images regardless of alignment.

Figure 2:
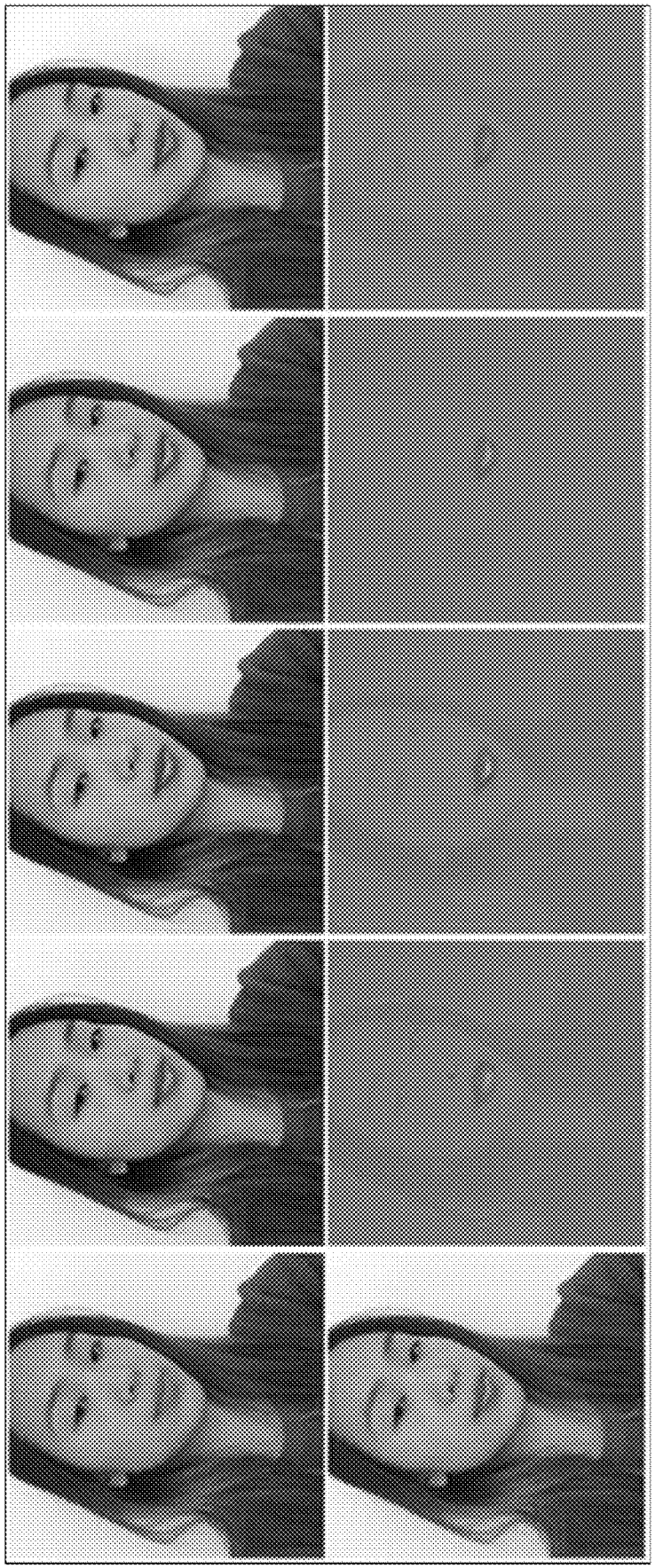
FIG. 2 is a graphical representation in tabular form of the effect of downsampling, dilation and number of residual block layers according to examples.

To reduce the noise during evaluation, we only compare the lip area of generated and ground truth images. Common ways of evaluating generative models include Frechet Inception Distance (FID) [15] and Inception Score (IS) [16].
Down-Sampling, Dilation and Number of Layers Multi-stage down-sampling has made CNNs computationally practical on object classifying tasks in literatures. For tasks where detailed spatial information is required (e.g. image translation and reconstruction), however, this loss of spatial resolution can have significant impact on the performance of the model. Conversely, increasing the dilation factor of the convolutions or using a large number of residual blocks in the Generator helps with maintaining the spatial resolution and can be used to accurately model a detailed lipstick distribution. FIG. 2 shows an ablation study on the effect of changing these three hyper-parameters. The corresponding evaluation results based on the metrics described in section 4.1 are shown in Table 1.

TABLE 1

Evaluation result on 'all' test case with snapshots at epoch 400.

| experiment | input size | FID | IS | CC | GFLOPs | # of parameters |
|---|---|---|---|---|---|---|
| 2 ds dilation2~32 | 256 | 40.71 | 0.05 | 6.55E+06 | 20.7 | 3,119,764 |
| 1 ds dilation2~32 | 256 | 36.66 | 0.04 | 6.77E+06 | 50.3 | 2,819,986 |
| 1 ds dilation1 | 256 | 44.18 | 0.13 | 6.50E+06 | 50.3 | 2,819,986 |
| 1 ds 2layers | 256 | 39.95 | 0.06 | 6.72E+06 | 16.5 | 753,810 |
| 1 ds 2layers | 128 | | | | 4.1 | 753,810 |
| dm [3] | 256 | | | | 198.8 | 3,033,259 |

We find that the 9layer-1downsample-32dilation model gives best performance. However for real time applications like makeup-previewing on mobile devices, its computation and memory usage is beyond practical limit. In this case reducing the number of residual blocks to 2layer is a practical way of compromising between performance and computation.

Continuous Encoding on Synthetic Lipstick Dataset

For proof of concept, we first tried training on a hand-engineered encoding space of five dimensions (R, G, B, wetness, glossDetail). As opposed to FIG. 1, no reference encoder is needed in this case. The encoding $\vec{e}$ for a specific lipstick equals the (R, G, B, wetness, glossDetail) attribute vector of that lipstick, whereas the reverse encoding $\bar{e}$ towards no-lipstick domain is a constant vector of (−1,−1,−1,−1,−1).

Figure 3:
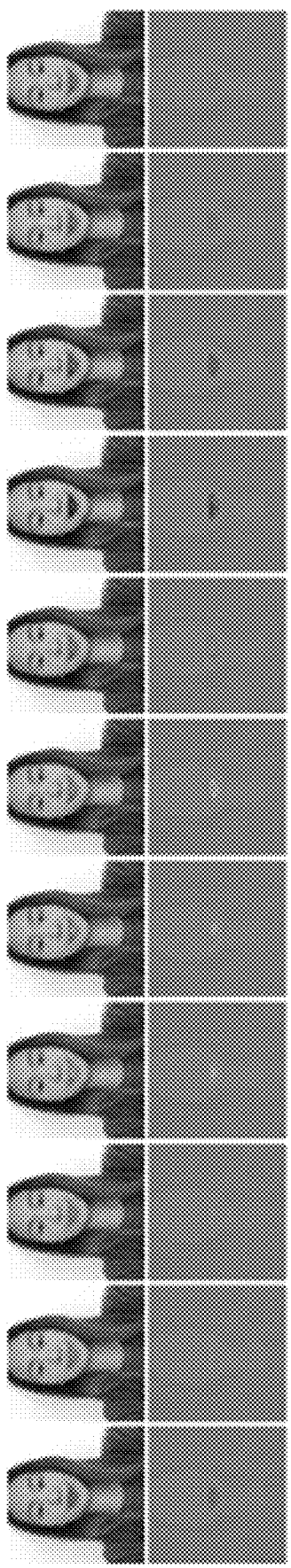
FIG. 3 is a graphical representation in tabular form showing interpolating the learned encoding space on color dimensions (hue from 0 to 360).
Figure 4:
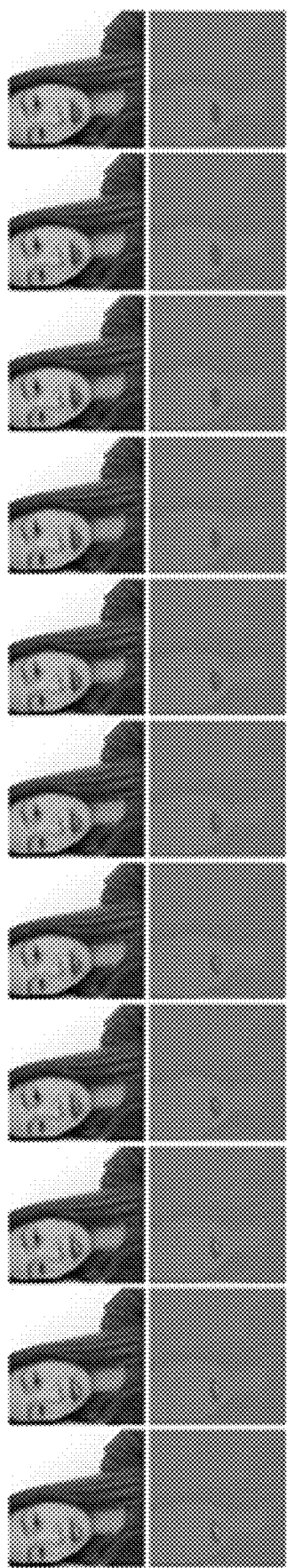
FIG. 4 is a graphical representation in tabular form showing interpolating the learned encoding space on wetness dimension (from 0 to 1).
Figure 5:
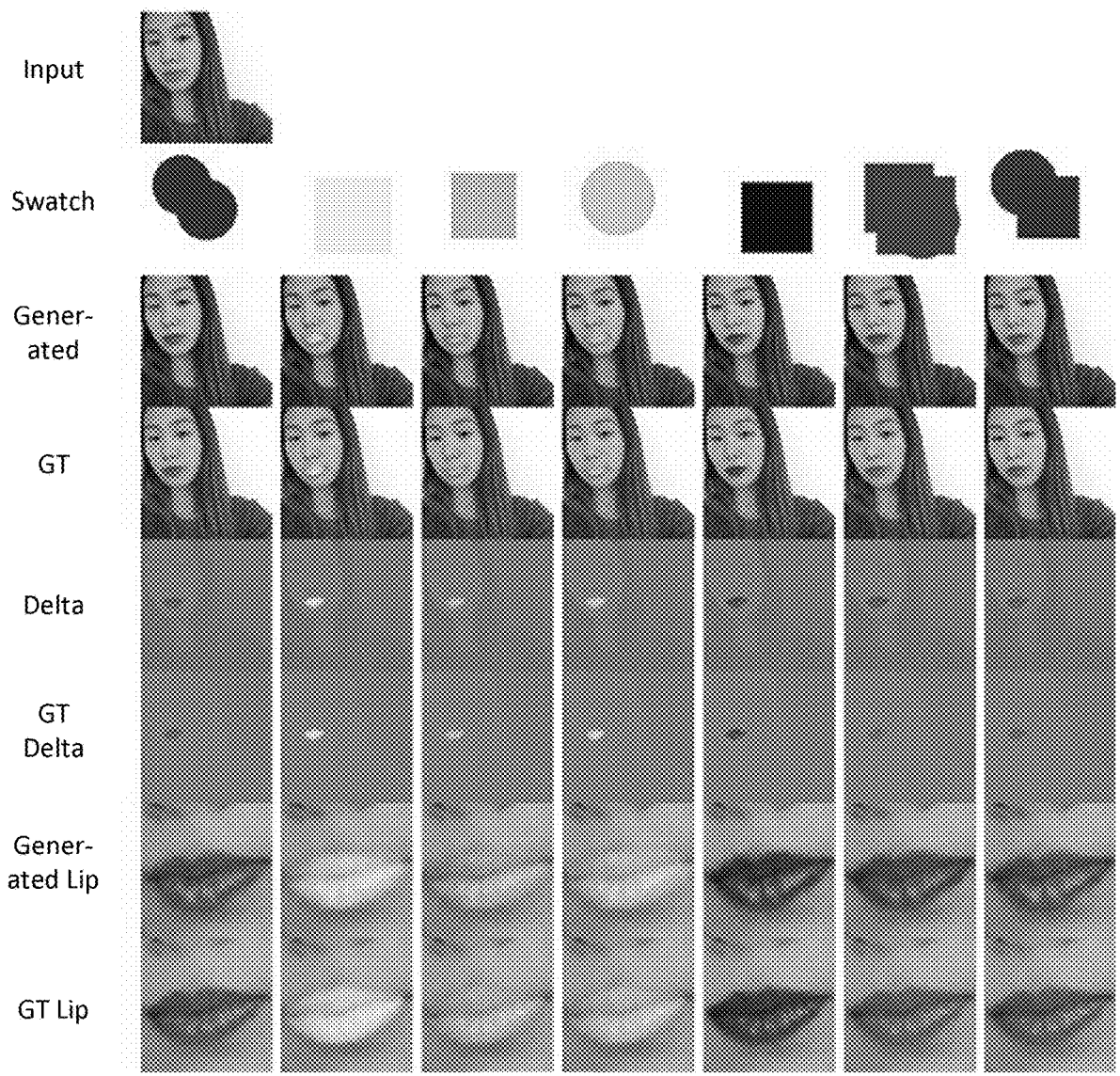
FIG. 5 is a graphical representation in tabular form showing interpolating the learned encoding space given synthetic swatch images on the test set. Note no ground-truth image is used during training.

FIGS. 3 and 4 show some generated images of the non-shared identity in the test set by interpolating this multi-dimensional encoding space in the RGB dimensions (hue=0~360°) and wetness dimension (wetness=0~1) respectively on some equal-interval sample points that do not necessarily appear during training. Reference image encoding on synthetic lipstick dataset FIG. 2 shows generated images from a model trained on a synthetic RGB swatch dataset. The training set in this dataset is generated according to the operations below:

1) sample an (R, G, B) point j from a uniform distribution U(R, G, B).

2) pass this color and a no-makeup photo x to a traditional virtual makeup try-on program to generate a synthetic image y with this color of lipstick j.

3) generate five synthetic swatch images with a similar color to j and different shapes.

4) repeat step 1 to 3 for all no-makeup photos.

The test set contains all identities in the training set but with different face positions or orientations. It also contains an additional identity (shown in FIGS. 2, 3, 4 and 5) that does not appear in the training set. The reference swatch images are generated based on a constant array of twelve equal-interval hue interpolation color points that does not necessarily appear in the training set. During testing, the model puts on each of those twelve lipsticks on test image for each image in the test set.
Example Computing Environment The above approach may be implemented in a computing device or a system of same such as a client-server model. The neural network models may be provided via an application (e.g. on a computing device) or via a web-browser (e.g. on a server computing device communicating with a client device (e.g. user device such as a tablet, smartphone, laptop, desktop, kiosk or other form factor)) to enable a user to take a selfie (image or video having images) and virtually try-on makeup in an augmented reality interface. The neural network models may be provided as a service from the cloud (e.g. receiving a no-makeup image and a makeup selection; and returning a "modified" or translated image showing the makeup applied to the no-makeup image).

The user may be provided with an interface (e.g. a graphical user interface (GUI)) to select or configure the makeup to be applied, to take a selfie image or selfie video and to view same with the makeup effect applied thereto. The selfie video may be translated to apply the effect (e.g. providing a 3D makeup effect appearing in the translated video) in real time or near real time.

Two or more generated images with different makeup respectively applied thereto may be stored and presented (e.g. side by side) for comparison in the GUI.

The interface may be activated/invoked in response to gestures (e.g. on a touch screen of a computing device), pointer input, voice input, text input, etc., and the computing device is configured with input and output devices and capabilities accordingly.

Instructions (software) may be provided (e.g. for storing to a storage unit of the computing device) to configure the operation of the computing device such as when the instructions are executed by a processing unit of the computing device.

In one aspect, the computing device translates an image from a first domain space to a second continuous domain space according to an effect to be applied to the image. The computing device comprises: a storage unit storing a conditional cycle-consistent generative adversarial network (ccGAN) model, configured to translate the image to the second continuous domain space, wherein the ccGAN model is conditioned through training using a plurality of encodings representing, in a continuous manner, physical properties of the effect to be applied and wherein the plurality of encodings are encoded from a plurality of respective discrete instances of the effect to be applied, the respective discrete instances including an instance representing no effect to be applied; and a processing unit configured to: receive the image and a desired instance of the effect to be applied; provide the image and the desired instance to the model to obtain a translated image; and provide the translated image for presenting.

The effect to be applied may be a makeup effect, for example, a virtual lipstick as shown and described.

The effect to be applied may be a hair color effect. That is, the proposed approach regarding makeup style transfer may be extended to hair color transfer/hair coloration. Hair coloration can be similarly applied for the purpose of modifying hair image pixels using a similar approach—the Generator G and Discriminator D are conditioned using training hair coloration images via the encoder E. Training images represent discrete instances of the effect (i.e. hair color) but are encoded to provide sufficient data to enable image translation at inference over a continuous (sub-) domain for the effect to be applied, just as in the virtual lipstick example. Training is performed in a similar manner with a collection of images X of people with a variety of hair colors, covering the hair color space j of interest for the coloration application. Training images X of subjects (e.g. people) should be taken under realistic range of lighting conditions. Training images would also comprise a sufficient number of different identities (i.e., different people) for identity preservation training.

To define hair swatches (e.g. images z) for training applied through Encoder E, there is collected another set of images of hair of the training subjects from the first image set. This second set of images is to be acquired under controlled lighting conditions, for example, so that hair swatches for color instances j are not polluted with nuisance factors, like a varying, random lighting condition. Sample hair image patches are extracted from theses controlled images and used for encoding particular hair color swatches. The totality of hair colors in training would define the color space. Similar to makeup product encoding, it is only required to sample the hair color space sparsely but preferably over a sufficient range to give broader choice to users and more accurate results for interpolating within the continuous domain such as when a color effect is desired but does not match a training example. In inference, a hair swatch not seen in the training process would be encoded and used to alter the hair color of the test subject (image) similarly to the makeup effect. A no hair effect $z_0$ may be similarly defined as described herein in relation to makeup effect.

In addition to computing device and method aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

Importantly, the neural network models transform the computing device from a general computing device to special device not previously seen. Devices and methods and other aspects provided in accordance with the neural network models effect a transformation or reduction of a particular article to a different state or thing—translating an image from one domain space to a second continuous domain space in which an effect is added. Devices and methods and other aspects provided in accordance with the neural network models involve specific features and/or functions and/or operations that, either (or both) 1) are other than what is well-understood, routine, conventional activity in the field, or 2) add unconventional steps that confine the aspect to a particular useful application.

Network Details

TABLE 2

Generator network architecture.

| Part | Input and Output | Layers |
|---|---|---|
| down-sampling | $(h, w, 3) \rightarrow (h, w, 64)$ | Conv(N64, K7, S1, P3), CBN(F16), ReLU |
| | $(h, w, 64) \rightarrow \left(\frac{h}{2}, \frac{w}{2}, 128\right)$ | Conv(N128, K3, S2, P1), CBN(F16), ReLU |
| bottleneck | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| | $\left(\frac{h}{2}, \frac{w}{2}, 128\right)$ | ResBlock(N128, K3, S1, P1), IN, ReLU |
| up-sampling | $\left(\frac{h}{2}, \frac{w}{2}, 128\right) \rightarrow (h, w, 64)$ | ConvTrans(N64, K3, S2, P1), CBN(F16), ReLU |
| | $(h, w, 64)$ | Conv(N64, K3, S1, P1) |
| | $(h, w, 64) \rightarrow (h, w, 3)$ | Conv(N3, K7, S1, P3), Tanh |
| reference encoder | $(128, 128, 3) \rightarrow (64, 64, 64)$ | Conv(N64, K3, S2, P1) |
| | $(64, 64, 64) \rightarrow (1, 1, 64)$ | AdaptiveAvgPooling(1) |

TABLE 3

Discriminator network architecture.

| Part | Input and Output | Layers |
|---|---|---|
| input | $(h, w, 3) \rightarrow (h, w, 64)$ | Conv(N64, K7, S1, P3), IN, ReLU |
| hidden layers | $(h, w, 64) \rightarrow \left(\frac{h}{2}, \frac{w}{2}, 128\right)$ | Conv(N128, K4, S2, P1), IN, leakyReLU |
| | $\left(\frac{h}{2}, \frac{w}{2}, 128\right) \rightarrow \left(\frac{h}{4}, \frac{w}{4}, 256\right)$ | Conv(N256, K4, S2, P1), IN, leakyReLU |
| | $\left(\frac{h}{4}, \frac{w}{4}, 256\right) \rightarrow \left(\frac{h}{8}, \frac{w}{8}, 512\right)$ | Conv(N512, K4, S2, P1), IN, leakyReLU |
| output | $\left(\frac{h}{8}, \frac{w}{8}, 512\right) \rightarrow \left(\frac{h}{8}, \frac{w}{8}, 64\right)$ | ConvTrans(N64, K3, S2, P1), CBN(F16), ReLU |
| | $\left(\frac{h}{8}, \frac{w}{8}, 64\right) \rightarrow (1, 1, 64)$ | AdaptiveAvgPooling(1) |
| | $(1, 1, 64) \rightarrow (1, 1, 1)$ | Linear(1) |

TABLE 3-continued

Discriminator network architecture.

| Part | Input and Output | Layers |
| --- | --- | --- |
| reference encoder | (128, 128, 3) → (64, 64, 64) | Conv(N64, K3, S2, P1) |
| | (64, 64, 64) → (1, 1, 64) | AdaptiveAvgPooling(1) |

REFERENCES

[1] P. Isola, J.-Y. Zhu, T. Zhou, and A. A. Efros, "Image-to-image translation with conditional adversarial networks," in *Conference on Computer Vision and Pattern Recognition*, 2017.

[2] J.-Y. Zhu, T. Park, P. Isola, and A. A. Efros, "Unpaired image-to-image translation using cycle-consistent adversarial networks," in *Computer Vision (ICCV), 2017 IEEE International Conference on*, 2017.

[3] H. Chang, J. Lu, F. Yu, and A. Finkelstein, "PairedCycle-GAN: Asymmetric style transfer for applying and removing makeup," in *CVPR 2018*, June 2018.

[4] I. Goodfellow, J. Pouget-Abadie, M. Mirza, B. Xu, D. Warde-Farley, S. Ozair, A. Courville, and Y. Bengio, "Generative adversarial nets," in *Advances in Neural Information Processing Systems 27* (Z. Ghahramani, M. Welling, C. Cortes, N. D. Lawrence, and K. Q. Weinberger, eds.), pp. 2672-2680, Curran Associates, Inc., 2014.

[5] A. van den Oord, N. Kalchbrenner, and K. Kavukcuoglu, "Pixel recurrent neural networks," *CoRR*, vol. abs/1601.06759, 2016.

[6] D. P. Kingma and M. Welling, "Auto-Encoding Variational Bayes," *ArXiv e-prints*, Dec. 2013.

[7] D. P. Kingma and P. Dhariwal, "Glow: Generative Flow with Invertible 1×1 Convolutions," *ArXiv e-prints*, July 2018.

[8] T. Miyato and M. Koyama, "cGANs with projection discriminator," in *International Conference on Learning Representations*, 2018.

[9] M. Mirza and S. Osindero, "Conditional generative adversarial nets," *arXiv preprint arXiv: 1411.1784*, 2014.

[10] S. Reed, Z. Akata, X. Yan, L. Logeswaran, B. Schiele, and H. Lee, "Generative adversarial text-to-image synthesis," in *Proceedings of The 33rd International Conference on Machine Learning*, 2016.

[11] Y. Choi, M. Choi, M. Kim, J.-W. Ha, S. Kim, and J. Choo, "Stargan: Unified generative adversarial networks for multi-domain image-to-image translation," *arXiv preprint arXiv: 1711.09020*, 2017.

[12] E. Perez, H. de Vries, F. Strub, V. Dumoulin, and A. C. Courville, "Learning visual reasoning without strong priors," *CoRR*, vol. abs/1707.03017, 2017.

[13] E. Perez, H. De Vries, F. Strub, V. Dumoulin, and A. Courville, "Learning Visual Reasoning Without Strong Priors," in *ICML 2017's Machine Learning in Speech and Language Processing Workshop*, (Sidney, France), Aug. 2017.

[14] T. Miyato, T. Kataoka, M. Koyama, and Y. Yoshida, "Spectral normalization for generative adversarial networks," in *International Conference on Learning Representations*, 2018.

[15] M. Heusel, H. Ramsauer, T. Unterthiner, B. Nessler, G. Klambauer, and S. Hochreiter, "Gans trained by a two time-scale update rule converge to a nash equilibrium," *CoRR*, vol. abs/1706.08500, 2017.

[16] T. Salimans, I. J. Goodfellow, W. Zaremba, V. Cheung, A. Radford, and X. Chen, "Improved techniques for training gans," *CoRR*, vol. abs/1606.03498, 2016.

What we claim is:

1. A computing device to translate an image from a first domain space to a second continuous domain space according to an effect to be applied to the image, the computing device comprising:

a storage unit storing a conditional cycle-consistent generative image-to-image translation model configured to translate the image to the second continuous domain space, wherein the model is conditioned through training using a plurality of encodings representing, in a continuous manner, physical properties of the effect to be applied and wherein the plurality of encodings are encoded from a plurality of respective discrete instances of the effect to be applied, the respective discrete instances including an instance representing no effect to be applied; and a processing unit configured to, at inferenced time: receive the image and a desired instance of the effect to be applied; provide the image and the desired instance to the model to obtain a translated image; and provide the translated image for presenting;

wherein the model comprises at inference time, a Generator (G) trained at a training time along with a Discriminator (D) using a plurality of encodings of effects to be applied, including no effect to be applied, as encoded by an encoder (E); and parameters $\theta_G$ for the Generator (G) comprise parameters optimized by minimization of an adversarial loss and a cycle-consistency loss, and parameters $\theta_D$ for the Discriminator (D) comprise parameters optimized by maximization of the adversarial loss according to:

$$\theta_G^* = \operatorname*{argmin}_{\theta_G} \mathcal{L}_{GAN}(G, D \mid z_j) + \mathcal{L}_{GAN}(G, D \mid z_0) + \lambda \mathcal{L}_{cyc}(G) \quad (1)$$

$$\theta_D^* = \operatorname*{argmax}_{\theta_D} \mathcal{L}_{GAN}(G, D \mid z_j) + \mathcal{L}_{GAN}(G, D \mid z_0) \quad (2)$$

where: $z_j$ comprises the $j^{th}$ reference image of a plurality of reference images representing each of the respective discrete instances of the effect to be applied; and $z_0$ comprises a white image corresponding to no effect to be applied.

2. The computing device of claim 1, wherein the effect to be applied is an augmented reality effect.

3. The computing device of claim 1, wherein the effect to be applied comprises one of a makeup effect, nail effect and a hair coloration effect.

4. The computing device of claim 1 wherein the model comprises a conditional cycle-consistent generative adversarial network (ccGAN) model.

5. The computing device of claim 1, wherein the image is free from the effect to be applied and the first domain space is defined by a plurality of images each free from the effect to be applied.

6. The computing device of claim 1, wherein the Generator (G) is conditioned with the plurality of encodings using convolutional conditional batch normal operations for each respective encoding of the plurality of encodings.

7. The computing device of claim 1, wherein the Discriminator (D) is conditioned with the plurality of encodings using output projection operations for each respective encoding of the plurality of encodings.

8. The computing device of claim 1, wherein the encoder is configured to encode the physical properties of each of the respective instances of the effect to be applied from respective swatch images for each of the respective instances including a swatch image representing no effect to be applied.

9. The computing device of claim 1, wherein the model comprises the Generator (G) as trained.

10. The computing device of claim 9, wherein:
the computing device is coupled to a data store comprising a storage device configured to store the plurality of encodings; and
the processing unit is configured to provide to the model a corresponding one of the plurality of encodings corresponding to the desired instance of the effect to be applied.

11. The computing device of claim 10, wherein:
the data store stores one or more one non-trained instance encodings for respecting instances of the effect to be applied that were not trained to the model; and
the processing unit is configured to provide to the model a corresponding one of the one or more one non-trained instance encodings corresponding to the desired instance of the effect to be applied.

12. The computing device of claim 1, wherein in respect of equation (1):

$$\mathcal{L}_{GAN}(G,D|z_0) = \mathbb{E}_{x \sim P_{data}(x)}[\log D(x|z_0)]$$
$$+ \mathbb{E}_{y \sim P_{data}(y)}[\log(1-D(G(y|z_0)|z_0))]$$
$$\mathcal{L}_{GAN}(G,D|z_j) = \mathbb{E}_{y \sim P_{data}(y)}[\log D(y|z_j)]$$
$$+ \mathbb{E}_{x \sim P_{data}(x)}[\log(1-D(G(x|z_j)|z_j))]$$
$$\mathcal{L}_{cyc}(G) = \mathbb{E}_{x \sim P_{data}(x)}[\|G(G(x|z_j)-x\|_1]$$
$$+ \mathbb{E}_{y \sim P_{data}(y)}[\|G(G(y|z_j)|z_j)-y\|_1]$$

where x is an image in the first domain space, y is an image in the second continuous domain space, and $p_{data}(x)$ and $p_{data}(y)$ are the respective distributions of the parametric data in first and second domain spaces.

13. The computing device of claim 1, wherein, in respect of equation (2):

$$\mathcal{L}_{GAN}(G,D|z_0) = \mathbb{E}_{x \sim P_{data}(x)}[\log D(x|z_0)]$$
$$+ \mathbb{E}_{y \sim P_{data}(y)}[\log(1-D(G(y|z_0)|z_0))]$$
$$\mathcal{L}_{GAN}(G,D|z_j) = \mathbb{E}_{y \sim P_{data}(y)}[\log D(y|z_j)]$$
$$+ \mathbb{E}_{x \sim P_{data}(x)}[\log(1-D(G(x|z_j)|z_j))]$$

where x is an image in the first domain space, y is an image in the second continuous domain space, and $p_{data}(x)$ and $p_{data}(y)$ are the respective distributions of the parametric data in first and second domain spaces.

14. The computing device of claim 1, wherein the image comprises a selfie image or a selfie video, and, in the case of the selfie video, the processing unit is configured to translate images of the selfie video to apply the effect thereto to create a 3D effect.

15. The computing device of claim 1, wherein the translated image comprises a region of the image and wherein the processing unit is configured to blend the translated image into the image for presenting.

16. The computing device of claim 1, wherein, one of:
a. the computing device comprises a camera; and
b. the computing device is coupled to a camera;
to capture the image for the processing unit to receive.

17. The computing device of claim 1, wherein the computing device comprises a server and the processing unit receives the image and the desired instance from a client device in communication with the server.

18. The computing device of claim 1, wherein the storage device stores instructions for an interface to provide a user with a desired instance selection function to define the desired instance and wherein the processor provides the interface, receives input and defines the desired instance in response to the input.

19. The computing device of claim 18 wherein the input comprises a custom effect not previously trained to the model.

20. The computing device of claim 19 wherein the storage device stores instructions for a search function to search previously computed encodings for use to define the desired effect and wherein the processor uses the input and search function to find a best match for the custom effect from the computed encodings to define the desired effect.

21. The computing device of claim 19 wherein the storage device stores instructions for providing an encoding function to define a new encoding for the desired effect and wherein the processor uses the input and the encoding function to define the desired effect for the custom effect.

22. A computing device configured to generate a conditional cycle-consistent generative image-to-image translation model, the model configured to translate an image from a first domain space to a second continuous domain space according to an effect to be applied to the image, the computing device comprising:
a storage device storing the model comprising a Generator, a Discriminator and an encoder, the model configured to condition the Generator and the Discriminator through training using a plurality of encodings from the encoder representing, in a continuous manner, physical properties of the effect to be applied and wherein the plurality of encodings are encoded from a plurality of respective discrete instances of the effect to be applied, the respective discrete instances including an instance representing no effect to be applied; and
a processing unit configured to:
receive training data and provide the training data in batches to define the model as trained;
wherein to receive the training data, the processing unit is configured to:
receive a plurality of real images x from the first domain space X comprising a no-effect applied domain space and each x having no effect applied;
receive a plurality of real images $y_j$ from the second continuous domain space Y comprising an effect applied domain space and each $y_j$ having an instance j of the effect applied, where j=1, 2, 3, . . . represents each of the respective discrete instances of the effect;

receive a plurality of reference images $z_j$ to represent each of the respective discrete instances of the effect; and receive a white image $z_0$ corresponding to no effect to be applied;

the processing unit is further configured to initiate parameters $\theta_G$ and $\theta_D$ for the Generator (G) and Discriminator (D); and to provide the training data in batches the processing unit is configured to operate to:

repeatedly, in batches and training epochs determined from the training data, use the encoder to encode an encoding $E(z_j)$ for the Generator (G) and Discriminator (D);

use the encoder to encode an encoding $E(z_0)$ for the Generator;

provide the image x and encoding $E(z_j)$ to the Generator (G) to generate a fake image $y_{j_{fake}}$ in the second continuous domain space;

provide the fake image $y_{j_{fake}}$ and real image $y_j$ corresponding thereto with encoding $E(z_j)$ to the Discriminator (D) to generate output $d_j$;

provide the fake image $y_{j_{fake}}$ and encoding $E(z_0)$ to the Generator (G) to output x'; and optimize parameters $\theta_G$ for the Generator (G) by minimizing the adversarial loss and cycle-consistency loss, and optimize parameters $\theta_D$ for the Discriminator (D) by maximizing the adversarial loss according to:

$$\theta_{\hat{G}} = \underset{\theta_G}{\arg\min}\ \mathcal{L}_{GAN}(G, D\,|\,z_j) + \mathcal{L}_{GAN}(G, D\,|\,z_0) + \lambda\mathcal{L}_{cyc}(G)$$

$$\theta_{\hat{D}} = \underset{\theta_D}{\arg\max}\ \mathcal{L}_{GAN}(G, D\,|\,z_j) + \mathcal{L}_{GAN}(G, D\,|\,z_0).$$

23. The computing device of claim 22, wherein the effect to be applied comprises one of a makeup effect, and a hair coloration effect.

24. The computing device of claim 22, wherein Generator (G) is conditioned with the plurality of encodings using convolutional conditional batch normal operations for each respective encoding of the plurality of encodings.

25. The computing device of claim 22, wherein the Discriminator (D) is conditioned with the plurality of encodings using output projection operations for each respective encoding of the plurality of encodings.

26. A computer implemented method to translate an image from a first domain space to a second continuous domain space according to an effect to be applied to the image, the method comprising:

storing in a storage unit a conditional cycle-consistent generative image-to-image translation model, configured to translate the image to the second continuous domain space, wherein the model is conditioned through training using a plurality of encodings representing, in a continuous manner, physical properties of the effect to be applied and wherein the plurality of encodings are encoded from a plurality of respective discrete instances of the effect to be applied, the respective discrete instances including an instance representing no effect to be applied; and via a processing unit:

receiving the image and a desired instance of the effect to be applied;

providing the image and the desired instance to the model to obtain a translated image; and providing the translated image for presenting;

wherein the model comprises a Generator (G) and a Discriminator (D) respectively trained using the plurality of encodings encoded by an encoder (E); and parameters $\theta_G$ for the Generator (G) comprise parameters optimized by minimization of an adversarial loss and a cycle-consistency loss, and parameters $\theta_D$ for the Discriminator (D) comprise parameters optimized by maximization of the adversarial loss according to:

$$\theta_{\hat{G}} = \underset{\theta_G}{\arg\min}\ \mathcal{L}_{GAN}(G, D\,|\,z_j) + \mathcal{L}_{GAN}(G, D\,|\,z_0) + \lambda\mathcal{L}_{cyc}(G) \quad (1)$$

$$\theta_{\hat{D}} = \underset{\theta_D}{\arg\max}\ \mathcal{L}_{GAN}(G, D\,|\,z_j) + \mathcal{L}_{GAN}(G, D\,|\,z_0) \quad (2)$$

where: $z_j$ comprises the $j^{th}$ reference image of a plurality of reference images representing each of the respective discrete instances of the effect to be applied; and $z_0$ comprises a white image correspondinu to no effect to be applied.

27. The method of claim 26, wherein the model is defined from a conditional cycle-consistent generative adversarial network (ccGAN) model.

28. The method of claim 26, wherein the effect to be applied comprises one of a makeup effect, nail effect, and a hair coloration effect.

29. The method of claim 26, wherein the image comprises one free from the effect to be applied and the first domain space is defined by a plurality of images each free from the effect to be applied.

30. The method of claim 26, wherein the Generator (G) is conditioned with the plurality of encodings using convolutional conditional batch normal operations for each respective encoding of the plurality of encodings.

31. The method of claim 26, wherein the Discriminator (D) is conditioned with the plurality of encodings using output projection operations for each respective encoding of the plurality of encodings.

32. The method of claim 26, wherein the encoder is configured to encode the physical properties of each of the respective instances of the effect to be applied from respective swatch images for each of the respective instances including a swatch image representing no effect to be applied.

33. The method of claim 26, wherein the model comprises the Generator (G) as trained.

34. The method of claim 33, comprising retrieving from a data store comprising a storage device storing the plurality of encodings a corresponding one of the plurality of encodings corresponding to the desired instance of the effect to be applied to provide to the model.

35. The method of claim 34, wherein:

the data store stores one or more one non-trained instance encodings for respecting instances of the effect to be applied that were not trained to the model; and the method comprises retrieving from the database to provide to the model a corresponding one of the one or more one non-trained instance encodings corresponding to the desired instance of the effect to be applied.

36. The method of claim 26, wherein in respect of equation (1):

$$\mathcal{L}_{GAN}(G,D|z_0) = \mathbb{E}_{x \sim p_{data}(x)}[\log D(x|z_0)]$$
$$+ \mathbb{E}_{y \sim p_{data}(y)}[\log(1-D(G(y|z_0)|z_0))]$$
$$\mathcal{L}_{GAN}(G,D|z_j) = \mathbb{E}_{y \sim p_{data}(y)}[\log D(y|z_j)]$$
$$+ \mathbb{E}_{x \sim p_{data}(x)}[\log(1-D(G(x|z_j)|z_j))]$$
$$\mathcal{L}_{cyc}(G) = \mathbb{E}_{x \sim p_{data}(x)}[\|G(G(x|z_j)-x\|_1)]$$
$$+ \mathbb{E}_{y \sim p_{data}(y)}[\|G(G(y|z_j)|z_j)-y\|_1]$$

where x is an image in the first domain space, y is an image in the second continuous domain space, and $p_{data}(x)$ and $p_{data}(y)$ are the respective distributions of the parametric data in first and second domain spaces.

37. The method of claim 26, wherein, in respect of equation (2):

$$\mathcal{L}_{GAN}(G,D|z_0) = \mathbb{E}_{x \sim p_{data}(x)}[\log D(x|z_0)]$$
$$+ \mathbb{E}_{y \sim p_{data}(y)}[\log(1-D(G(y|z_0)|z_0))]$$
$$\mathcal{L}_{GAN}(G,D|z_j) = \mathbb{E}_{y \sim p_{data}(y)}[\log D(y|z_j)]$$
$$+ \mathbb{E}_{x \sim p_{data}(x)}[\log(1-D(G(x|z_j)|z_j))]$$

where x is an image in the first domain space, y is an image in the second continuous domain space, and $p_{data}(x)$ and $p_{data}(y)$ are the respective distributions of the parametric data in first and second domain spaces.

38. The method of claim 26 comprising capturing via the processing unit the image using a camera coupled thereto to receive the image.

39. The method of claim 26, wherein the image comprises one of a selfie image and a selfie video, and, in the case of the selfie video, the method translates images of the selfie video to apply the effect thereto to create a 3D effect.

40. The method of claim 26 comprising preprocessing the image by the processing unit prior to providing to the model.

41. The method of claim 26, wherein the translated image comprises a region of the image and wherein the method comprises blending the translated image into the image for presenting by the processing unit.

42. The method of claim 26 comprising: providing an interface comprising a desired instance selection function to define the desired instance; and receiving input via the desired instance selection function and defining the desired instance in response to the input.

43. The method of claim 42 wherein the input comprises a custom effect not previously trained to the model.

44. The method of claim 43 comprising searching previously computed encodings for use to define the desired effect using the input to find a best match for the custom effect from the computed encodings to define the desired effect.

45. The method of claim 43 comprising using an encoding function to define a new encoding for the desired effect in response to the input to define the desired effect for the custom effect.

46. A computer implemented method to generate a model of a conditional cycle-consistent generative image-to-image translation model, the model configured to translate an image from a first domain space to a second continuous domain space according to an effect to be applied to the image, the method comprising:

storing in a storage device the model, the model comprising a Generator, a Discriminator and an encoder, the model configured to condition the Generator and the Discriminator through training using a plurality of encodings from the encoder representing, in a continuous manner, physical properties of the effect to be applied and wherein the plurality of encodings are encoded from a plurality of respective discrete instances of the effect to be applied, the respective discrete instances including an instance representing no effect to be applied; and via a processing unit:
receive training data and provide the training data in batches to the model to define the model as trained;
wherein to receive the training data, the method comprises:
receiving a plurality of real images x from the first domain space X comprising a no-effect applied domain space and each x having no effect applied;
receiving a plurality of real images $y_j$ from the second continuous domain space Y comprising an effect applied domain space and each $y_j$ having an instance j of the effect applied, where j=1, 2, 3, ... represents each of the respective discrete instances of the effect;
receiving a plurality of reference images $z_j$ to represent each of the respective discrete instances of the effect; and
receiving a white image $z_0$ corresponding to no effect to be applied;
wherein the method further comprises initiating, by the processing unit, parameters $\theta_G$ and $\theta_D$ for the Generator (G) and Discriminator (D); and
wherein to provide the training data in batches, the method comprises:
repeatedly, in batches and training epochs determined from the training data,
using the encoder to encode an encoding $E(z_j)$ for the Generator (G) and Discriminator (D);
using the encoder to encode an encoding $E(z_0)$ for the Generator;
providing the image x and encoding $E(z_j)$ to the Generator (G) to generate a fake image $y_{j_{fake}}$ in the second continuous domain space;
providing the fake image $y_{j_{fake}}$ and real image $y_j$ corresponding thereto with encoding $E(z)$ to the Discriminator (D) to generate output $d_j$;
providing the fake image $y_{j_{fake}}$ and encoding $E(z_0)$ to the Generator (G) to output x'; and
optimizing parameters $\theta_c$ for the Generator (G) by minimizing the adversarial loss and cycle-consistency loss, and optimize parameters $\theta_D$ for the Discriminator (D) by maximizing the adversarial loss according to:

$$\theta_{\hat{G}} = \underset{\theta_G}{\operatorname{argmin}} \ \mathcal{L}_{GAN}(G, D \mid z_j) + \mathcal{L}_{GAN}(G, D \mid z_0) + \lambda \mathcal{L}_{cyc}(G)$$

$$\theta_{\hat{D}} = \underset{\theta_D}{\operatorname{argmax}} \ \mathcal{L}_{GAN}(G, D \mid z_j) + \mathcal{L}_{GAN}(G, D \mid z_0).$$

47. The method of claim 46, wherein the effect to be applied comprises an augmented reality effect.

48. The method of claim 46, wherein the effect to be applied comprises any one of a makeup effect, a nail effect and a hair coloration effect.

49. The method of claim 46, wherein Generator (G) is conditioned with the plurality of encodings using convolutional conditional batch normal operations for each respective encoding of the plurality of encodings.

50. The method of claim 29, wherein the Discriminator (D) is conditioned with the plurality of encodings using output projection operations for each respective encoding of the plurality of encodings.

51. A computer program product comprising a non-transient storage unit storing instructions which when executed by a processing unit of a computing device configure the computing device to perform a method to translate an image from a first domain space to a second continuous domain space according to an effect to be applied to the image, the method comprising:

receiving the image and a desired instance of the effect to be applied to the image;

providing the image and the desired instance to a model to obtain a translated image; and providing the translated image for presenting;

wherein the model comprises a conditional cycle-consistent generative image-to-image translation model configured to translate images from the first domain space to the second continuous domain space, wherein the model is conditioned through training using a plurality of encodings representing, in a continuous manner, physical properties of the effect to be applied and wherein the plurality of encodings are encoded from a plurality of respective discrete instances of the effect to be applied, the respective discrete instances including an instance representing no effect to be applied;

wherein the model comprises a Generator (G) and a Discriminator (D) respectively trained using the plurality of encodings encoded by an encoder (E); and parameters $\theta_G$ for the Generator (G) comprise parameters optimized by minimization of an adversarial loss and a cycle-consistency loss, and parameters $\theta_D$ for the Discriminator (D) comprise parameters optimized by maximization of the adversarial loss according to:

$$\theta_G^* = \underset{\theta_G}{\mathrm{argmin}}\ \mathcal{L}_{GAN}(G, D \mid z_j) + \mathcal{L}_{GAN}(G, D \mid z_0) + \lambda \mathcal{L}_{cyc}(G) \quad (1)$$

$$\theta_D^* = \underset{\theta_D}{\mathrm{argmax}}\ \mathcal{L}_{GAN}(G, D \mid z_j) + \mathcal{L}_{GAN}(G, D \mid z_0) \quad (2)$$

where: $z_j$ comprises the $j^{th}$ reference image of a plurality of reference images representing each of the respective discrete instances of the effect to be applied; and $z_0$ comprises a white image corresponding to no effect to be applied.

* * * * *